United States Patent
Yang

(10) Patent No.: US 10,412,638 B2
(45) Date of Patent: Sep. 10, 2019

(54) FAST RETURN METHOD, APPARATUS, AND SYSTEM FOR CSFB USER EQUIPMENT

(71) Applicant: HUAWEI TECHNOLOGIES CO., LTD., Shenzhen, Guangdong (CN)

(72) Inventor: Bing Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 15/623,986

(22) Filed: Jun. 15, 2017

(65) Prior Publication Data

US 2017/0289861 A1 Oct. 5, 2017

Related U.S. Application Data

(63) Continuation of application No. PCT/CN2014/093913, filed on Dec. 16, 2014.

(51) Int. Cl.
*H04W 36/00* (2009.01)
*H04W 76/30* (2018.01)
*H04W 76/34* (2018.01)

(52) U.S. Cl.
CPC ....... *H04W 36/0022* (2013.01); *H04W 76/30* (2018.02); *H04W 76/34* (2018.02)

(58) Field of Classification Search
None
See application file for complete search history.

(56) References Cited

U.S. PATENT DOCUMENTS

2013/0287002 A1* 10/2013 Kim ................ H04W 36/0022
370/331
2014/0003364 A1 1/2014 Ramachandran et al.
(Continued)

FOREIGN PATENT DOCUMENTS

CN 102769932 A 11/2012
CN 103167564 A 6/2013
(Continued)

OTHER PUBLICATIONS

CS Information Gateway, 2013, Huawei, Issue 6, p. 3 (Year: 2013).*
(Continued)

*Primary Examiner* — Charles C Jiang
*Assistant Examiner* — Saad Khawar
(74) *Attorney, Agent, or Firm* — Staas & Halsey LLP

(57) ABSTRACT

A fast return method for CSFB user equipment, includes: receiving a trigger message sent by a mobile switching center MSC, where the trigger message is used to trigger release of a circuit switched CS service of CSFB user equipment UE, and the UE runs both the CS service and a packet switched PS service; and sending a radio resource control RRC connection release message to the UE according to the trigger message, so as to trigger the UE to release a radio bearer of the CS service, a radio bearer of the PS service, and an RRC connection according to the RRC connection release message and fast return to a Long Term Evolution LTE network. According to embodiments of the present invention, a delay for the CSFB user equipment to return to the LTE network can be reduced, thereby improving user experience.

8 Claims, 4 Drawing Sheets

(56) References Cited

U.S. PATENT DOCUMENTS

| | | | |
|---|---|---|---|
| 2014/0079021 A1 | 3/2014 | Hsu | |
| 2015/0201352 A1* | 7/2015 | Shan | H04W 52/243 370/235 |
| 2015/0296420 A1* | 10/2015 | Drevon | H04W 36/0022 455/436 |

FOREIGN PATENT DOCUMENTS

| | | |
|---|---|---|
| CN | 103686904 A | 3/2014 |
| CN | 103987123 A | 8/2014 |
| EP | 2717623 A1 | 4/2014 |
| EP | 2720510 A1 | 4/2014 |

OTHER PUBLICATIONS

International Search Report dated Sep. 21, 2015 in corresponding International Application No. PCT/CN2014/093913.

Ericsson: "Fast Return after CSFB," 3GPP Draft, R3-112986, 3$^{rd}$ Generation Partnership Project (3GPP), Mobile Competence Centre; 650, Route Des Lucioles; F-06921, Sophia-Antipolis Cedex; France, vol. RAN WG3, No. San Francisco, USA, Nov. 4, 2011, XP050566180.

Huawei et al.: "How to transfer the last used LTE PLMN identity for CSFB to UTRAN," 3GPP Draft, 3$^{rd}$ Generation Partnership Project (3GPP), Mobile Competence Centre, vol. SA WG2, No. St. Julian; Jun. 10, 2014, XP050868916.

Vodafone et al.: "The need for CSFB indication from the UE," 3GPP Draft, R3-120369, 3$^{rd}$ Generation Partnership Project (3GPP), Mobile Competence Centre; 650, Route Des Lucioles; F-06921, Sophia-Antipolis Cedex; France, vol. RAN WG3, No. Dresden, Germany, Feb. 8, 2012 XP050566767.

Extended European Search Report dated Oct. 19, 2017 in corresponding European Patent Application No. 14908132.5222.

International Search Report filed Sep. 21, 2015 in corresponding International Application No. PCT/CN2014/093913.

Huawei; "CS Information Gateway"; Convergence Communication Documentation Department, Issue 6, 2013; CS Fallback Solution—CSFB Is Coming; 8 pages.

Chinese Office Action for Chinese Application No. 201480081126.4 dated Mar. 4, 2019.

European Office Action for European Application No. 14908132.5 dated Apr. 15, 2019.

* cited by examiner

FAST RETURN METHOD, APPARATUS, AND SYSTEM FOR CSFB USER EQUIPMENT

CROSS-REFERENCE TO RELATED APPLICATIONS

This application is a continuation of International Application No. PCT/CN2014/093913, filed on Dec. 16, 2014, the disclosure of which is hereby incorporated by reference in its entirety.

TECHNICAL FIELD

The present disclosure relates to a mobile communications system, and in particular, to a fast return method, apparatus, and system for circuit switched fallback user equipment.

BACKGROUND

To meet a requirement for a voice service in a network that does not support a voice over Long Term Evolution (LTE) (Voice over LTE, VoLTE) function, a circuit switched fallback (CSFB) technology is used in the existing 3GPP. The CSFB enables user equipment (UE) to fall back to a Global System for Mobile Communications (GSM) network or Universal Mobile Telecommunications System (UMTS) network. If CSFB user equipment falls back to the UMTS network, in a process in which a circuit switched (CS) service is performed, a packet switched (PS) service may be concurrently performed, and the PS service may not end when the CS service ends. In the prior art, a method shown in FIG. 1 is used to implement fast return of the CSFB user equipment.

Step 1: The UE sends a disconnect (disconnect) message to a mobile switching center (MSC).

Step 2: The MSC sends a release (release) message to the UE.

Step 3: The UE sends a release complete (release complete) message to the MSC.

Step 4: The MSC sends an Iu release command (Iu release command) to a radio network controller (RNC).

Step 5: The RNC sends a radio link reconfiguration prepare (radio link reconfiguration prepare) message to a base station.

Step 6: The base station sends a radio link reconfiguration ready (radio link reconfiguration ready) message to the RNC.

Step 7: The RNC sends a radio bearer release (radio bearer release) message to the UE.

Step 8: The base station sends a radio link reconfiguration commit (radio link reconfiguration commit) message to the RNC.

Step 9: The UE sends a radio bearer release complete (radio bearer release complete) message to the RNC.

Step 10: The RNC sends an Iu release complete message to the MSC.

Step 11: Initiate PS release when a PS inactivity timer expires, where duration of the inactivity timer may be used to limit time during which the UE is in a PS inactive state.

Step 12: The RNC sends a radio resource control (RRC) connection release (RRC connection release) message, where the RRC connection release message carries target frequency information.

Step 13: The UE fast returns to an LTE network according to the target frequency information.

Step 14: Release PS service resources of an Iu interface and an Iub interface.

It can be seen from FIG. 1 that before returning to the LTE network, the UE needs to complete CS service release, PS service release, and RRC connection release processes. An entire release process is complex and takes a long time. Therefore, a delay for the CSFB user equipment to return to the LTE network is extremely long, and consequently, user experience becomes poor.

SUMMARY

Embodiments of the present invention provide a fast return method, apparatus, and system for CSFB user equipment, so as to reduce a delay for CSFB user equipment to return to an LTE network, thereby improving user experience.

A first aspect of the present invention provides a fast return method for CSFB user equipment, including: receiving a trigger message from a mobile switching center MSC, where the trigger message is used to trigger release of a circuit switched CS service of CSFB user equipment UE, and the UE runs both the CS service and a packet switched PS service; and sending an RRC connection release message to the UE according to the trigger message, so as to trigger the UE to release a radio bearer of the CS service, a radio bearer of the PS service, and an RRC connection according to the RRC connection release message and fast return to a Long Term Evolution LTE network.

With reference to the first aspect, in a first implementation manner of the first aspect, the method further includes: releasing, according to the trigger message, an Iu interface CS domain resource occupied by the UE.

With reference to the first aspect or the first implementation manner of the first aspect, in a second implementation manner of the first aspect, after the sending RRC connection release to the UE according to the trigger message, the method further includes: sending a PS domain release request message to a serving GPRS support node SGSN according to the trigger message; and receiving an Iu release command from the SGSN, and releasing an Iu interface PS domain resource occupied by the UE.

With reference to the second implementation manner of the first aspect, in a third implementation manner of the first aspect, the method further includes: triggering, according to the Iu release command from the SGSN, a base station to release an Iub interface CS domain resource and/or an Iub interface PS domain resource occupied by the UE.

With reference to any one of the first aspect, or the foregoing implementation manners of the first aspect, in a fourth implementation manner of the first aspect, the trigger message is an Iu release command.

A second aspect of the present invention provides a fast return apparatus for CSFB user equipment, including: a receiver, configured to receive a trigger message from a mobile switching center MSC, where the trigger message is used to trigger release of a CS service of CSFB user equipment UE, and the UE runs both the CS service and a PS service; a processor, configured to generate an RRC connection release message according to the trigger message received by the receiver; and a transmitter, configured to send the RRC connection release message generated by the processor to the UE, so as to trigger the UE to release a radio bearer of the CS service, a radio bearer of the PS service, and an RRC connection according to the RRC connection release message and fast return to a Long Term Evolution LTE network.

With reference to the second aspect, in a first implementation manner of the second aspect, the processor is further configured to: release, according to the trigger message, an Iu interface CS domain resource occupied by the UE.

With reference to the second aspect or the first implementation manner of the second aspect, in a second implementation manner of the second aspect, the processor is further configured to: after the RRC connection release message is sent to the UE according to the trigger message, send a PS domain release request message to a serving GPRS support node SGSN according to the trigger message; and the receiver is further configured to receive an Iu release command from the SGSN, and release an Iu interface PS domain resource occupied by the UE.

With reference to the second implementation manner of the second aspect, in a third implementation manner of the second aspect, the processor is further configured to: trigger, according to the Iu release command that is from the SGSN and received by the receiver, a base station to release an Iub interface CS domain resource and/or an Iub interface PS domain resource occupied by the UE.

With reference to any one of the second aspect, or the foregoing implementation manners of the second aspect, in a fourth implementation manner of the second aspect, the trigger message is an Iu release command.

A third aspect of the present invention provides a fast return system for CSFB user equipment, including: a radio network controller RNC, CSFB user equipment UE, and a mobile switching center MSC, where the UE runs both a CS service and a PS service; the MSC is configured to send a trigger message to the RNC, where the trigger message is used to trigger release of the CS service of the UE; the RNC is configured to receive the trigger message from the MSC, and send an RRC connection release message to the UE according to the trigger message; and the UE is configured to: receive the RRC connection release message from the RNC, release a radio bearer of the CS service, a radio bearer of the PS service, and an RRC connection according to the RRC connection release message, and fast return to an LTE network.

With reference to the third aspect, in a first implementation manner of the third aspect, the system further includes a serving GPRS support node SGSN; the RNC is further configured to send a PS domain release request message to the SGSN after receiving the trigger message from the MSC; and the SGSN is configured to receive the PS domain release request message from the RNC, and release an Iu interface PS domain resource occupied by the UE.

With reference to the first implementation manner of the third aspect, in a second implementation manner of the third aspect, the RNC is further configured to: trigger, according to an Iu release command from the SGSN, a base station to release an Iub interface CS domain resource and/or an Iub interface PS domain resource occupied by the UE.

With reference to any one of the third aspect or the foregoing implementation manners of the third aspect, in a third implementation manner of the third aspect, the RNC is further configured to: release, according to the trigger message from the MSC, an Iu interface CS domain resource occupied by the UE.

According to the method provided in the embodiments of the present invention, an RRC connection release message is sent to UE after a trigger message that is for releasing a CS service and that is from a core network is received, so as to trigger the UE to release the CS service, a PS service, and an RRC connection according to the RRC connection release message. A release process is simplified, so that time needed to release the CS service and the PS service is reduced. Therefore, a delay for CSFB user equipment to return to an LTE network is reduced, thereby improving user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

This specification describes various aspects with reference to a base station and/or a base station control device. A base station control device may be a base station controller (BSC) in a GSM or CDMA system, or may be an RNC in a WCDMA system. This is not limited in the embodiments of the present invention.

In the following description, to illustrate rather than limit, specific details such as a particular system structure, an interface, and a technology are provided to make a thorough understanding of the present invention. However, persons skilled in the art should know that the present invention may be practiced in other embodiments without these specific details. In other cases, detailed descriptions of well-known apparatuses, circuits, and methods are omitted, so that the present invention is described without being obscured by unnecessary details.

The term "and/or" in this specification describes only an association relationship for describing associated objects and represents that three relationships may exist. For example, A and/or B may represent the following three cases: Only A exists, both A and B exist, and only B exists.

Figure 2:
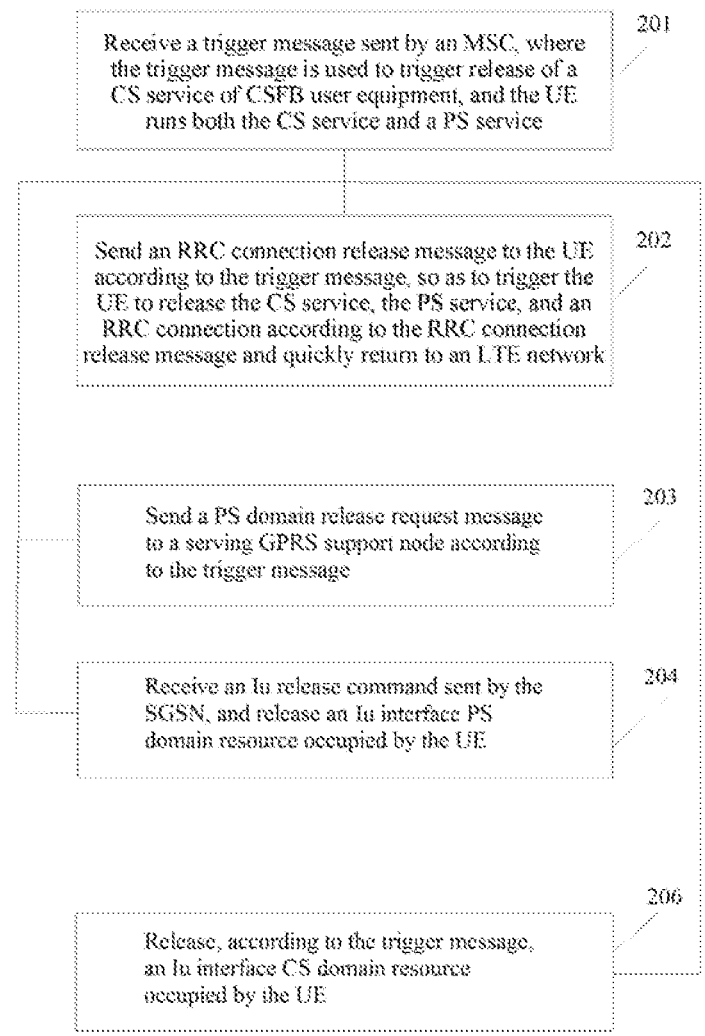
FIG. 2 is a flowchart of a fast return method for CSFB user equipment according to an embodiment of the present invention.

As shown in FIG. 2, an embodiment of the present invention provides a fast return method for circuit switched fallback user equipment, and details are described below. The method may be executed by the foregoing base station control device.

201. Receive a trigger message sent by an MSC, where the trigger message is used to trigger release of a CS service of CSFB user equipment UE, and the UE runs both the CS service and a PS service.

The trigger message may be specifically an Iu release command (Iu release command). The CSFB user equipment refers to user equipment that falls back from an LTE network to a 2G or 3G network by using a CSFB technology.

202. Send an RRC connection release (RRC connection release) message to the UE according to the trigger message, so as to trigger the UE to release a radio bearer of the CS service, a radio bearer of the PS service, and an RRC connection according to the RRC connection release message and fast return to an LTE network.

The RRC connection release message is used to trigger the UE to release the radio bearer of the CS service, the radio bearer of the PS service, and the RRC connection and fast return to the LTE network. The message may specifically carry a first release cause value, and the first release cause value is used to indicate that release triggered by the message is not abnormal release; or the message may carry a second release cause value, and the second release cause value is not only used to indicate that release triggered by the message is normal release but also used to indicate that the UE automatically initiates a PS connection after returning to the LTE network and resumes a previously interrupted PS service. For example, the second release cause value is direct signaling connection re-establishment (Directed Signalling Connection Re-establishment). In addition, the RRC connection release message carries target frequency information (Target Frequency Info), so that the CSFB UE returns to the LTE network according to the message.

It should be noted that in step 202, only an RRC connection release message is sent to the UE after the trigger message sent by the MSC is received. A CS domain radio bearer release process in steps 5 to 9 in the prior art is omitted, and a PS domain radio bearer release process in step 11 is also omitted. Therefore, duration used by the CSFB user equipment to return to the LTE network is significantly reduced.

According to the method provided in the foregoing embodiment, an RRC connection release message is sent to UE after a trigger message that is for releasing a CS service and that is sent by a core network is received, so as to trigger the UE to release the CS service, a PS service, and an RRC connection according to the RRC connection release message. A release process is simplified, so that time needed to release the CS service and the PS service is reduced. Therefore, a delay for CSFB user equipment to return to an LTE network is reduced, thereby improving user experience.

Optionally, in a first implementation scenario of this embodiment, after step 201, the method further includes:

203. Send a PS domain release request message to a serving GPRS support node (Serving GPRS Support Node, SGSN) according to the trigger message.

The PS domain release request may be specifically an Iu release request (Iu release request).

It should be noted that all messages such as the PS domain release request and an Iu release command in embodiments of the present invention may carry identifier information to indicate a specific operation object. For example, the identifier information may be identifier information of UE and/or identifier information of a resource occupied by the UE, and details are not described below.

204. Receive an Iu release command sent by the SGSN, and release an Iu interface PS domain resource occupied by the UE.

Further, the method may further include: triggering, according to the Iu release command sent by the SGSN, a base station to release an Iub interface CS domain resource and/or an Iub interface PS domain resource occupied by the UE.

It should be noted that an execution order of step 203 and step 202 is not limited, that is, step 203 may be performed before, after, or at the same time with step 202.

Optionally, in a second implementation scenario of this embodiment, after step 201, the method further includes:

206. Release, according to the trigger message, an Iu interface CS domain resource occupied by the UE.

Figure 1:
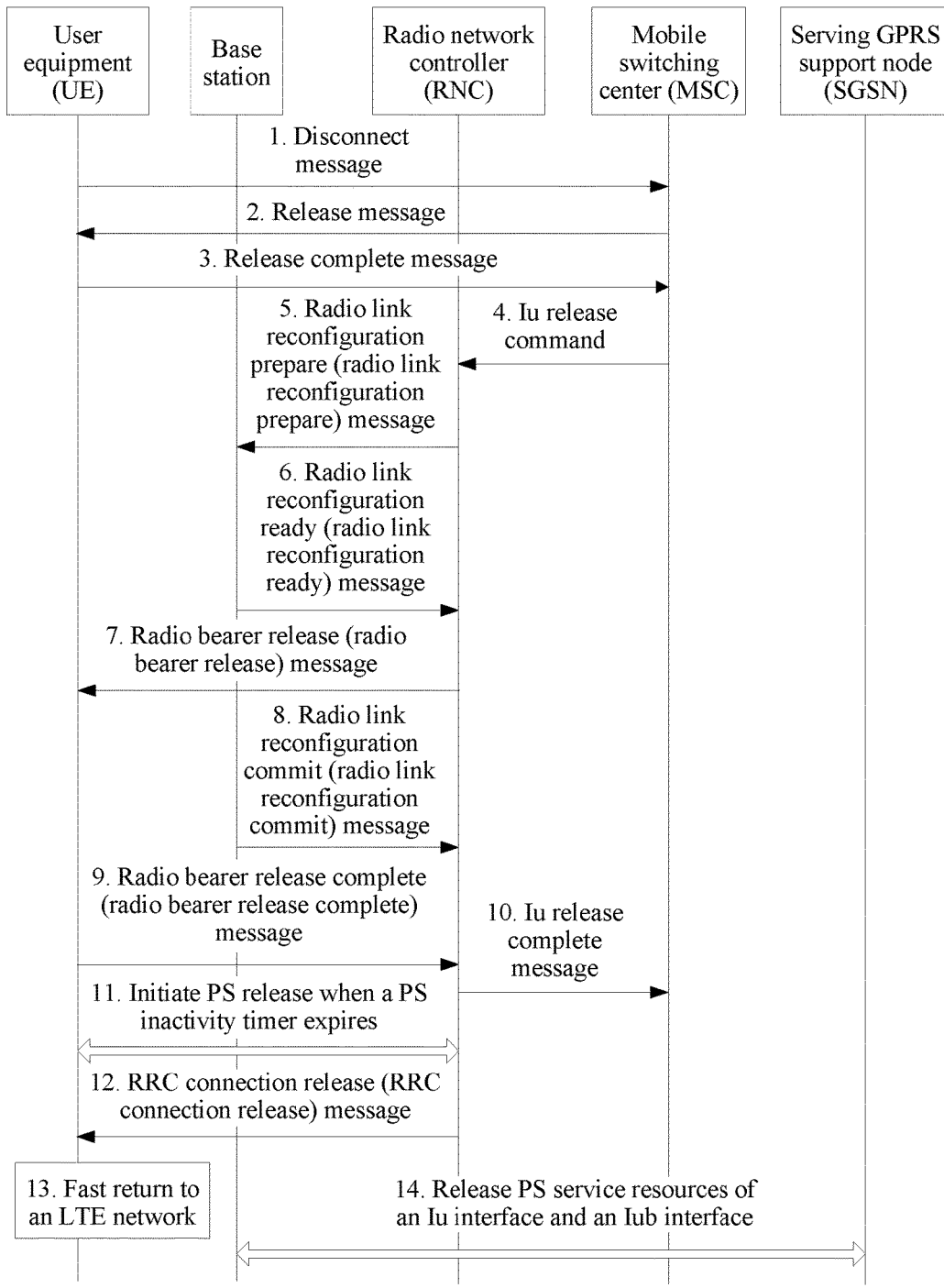
FIG. 1 is a flowchart of a fast return method for CSFB user equipment in the prior art.

Further, the method may further include: triggering, according to the trigger message, the base station to release the Iub interface CS domain resource occupied by the UE. For example, step 5 to step 10 in the method shown in FIG. 1 may be used to trigger the base station to release the Iu interface CS domain resource.

It should be noted that the foregoing two implementation scenarios may be combined, and details are not described herein. In addition, both an Iu interface and an Iub interface belong to the prior art. For example, the Iu interface refers to an interface between the MSC or SGSN and the base station control device, and the Iub interface refers to an interface between the base station control device and the base station.

Figure 3:
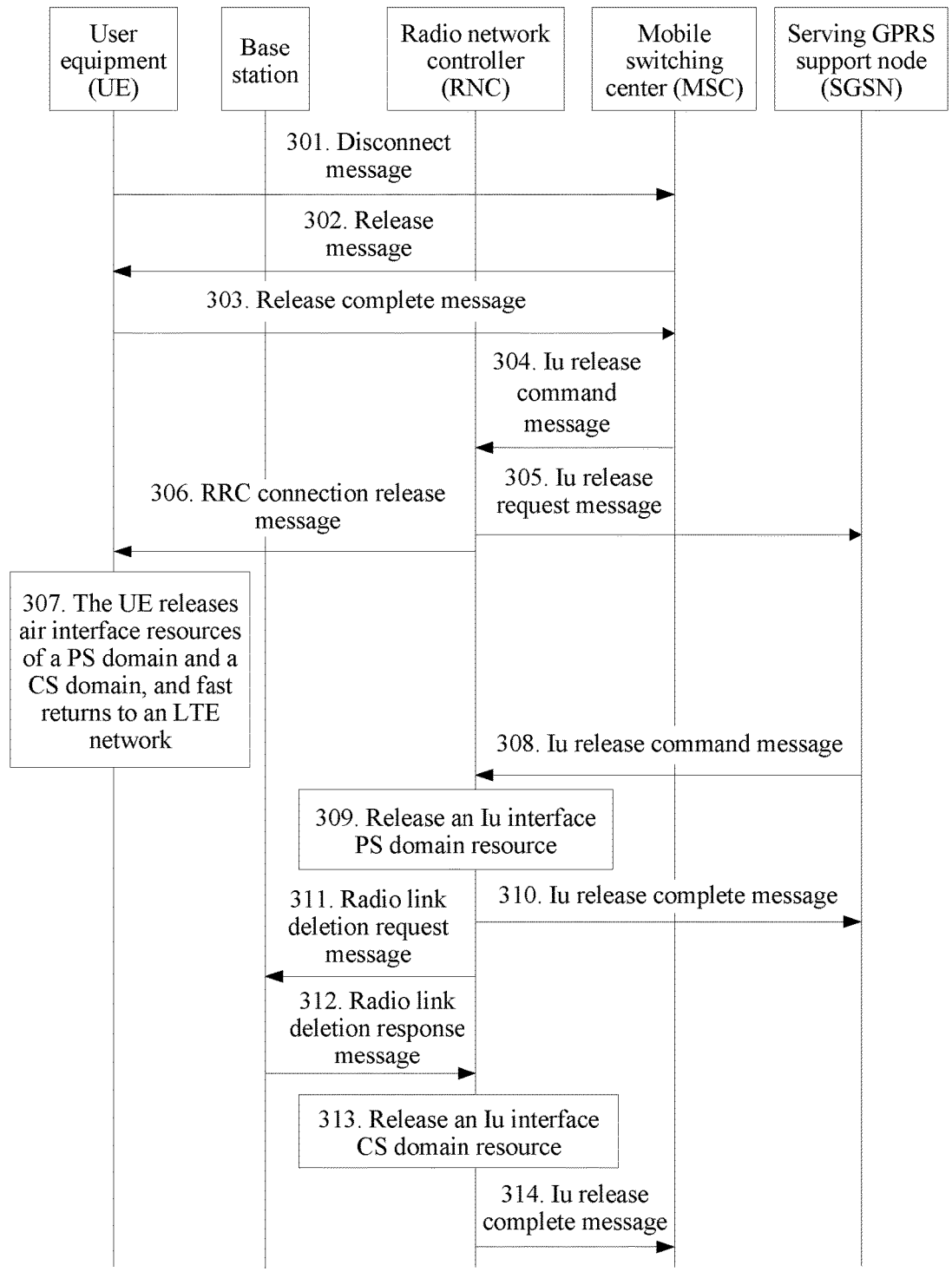
FIG. 3 is a flowchart of another fast return method for CSFB user equipment according to an embodiment of the present invention.

As shown in FIG. 3, an embodiment of the present invention provides another fast return method for CSFB user equipment, and details are described below. The method may be executed by a base station control device.

301. UE sends a disconnect (disconnect) message to an MSC.

302. The MSC sends a release (release) message to the UE.

303. The UE sends a release complete (release complete) message to the MSC.

304. The MSC sends an Iu release command message to an RNC.

305. The RNC sends an Iu release request message to an SGSN.

306. The RNC sends an RRC connection release message to the UE.

Execution orders of step 305 and step 306 may be interchanged, which is not limited herein.

307. The UE releases air interface resources of a PS domain and a CS domain, and fast returns to an LTE network.

Fast return of the UE to the LTE network in step 307 may be specifically implemented in a manner specified by a 3GPP protocol, and details are not described herein.

308. The SGSN sends the Iu release command message to the RNC according to the received Iu release request message.

309. The RNC releases an Iu interface PS domain resource according to the Iu release command message received from the SGSN.

For example, the Iu interface PS domain resource may be a PS radio access bearer.

310. The RNC sends an Iu release complete message to the SGSN.

311. The RNC sends a radio link deletion request (radio link deletion request) message to a base station.

The base station may be a NodeB.

312. The base station sends a radio link deletion response (radio link deletion response) message to the RNC.

313. The RNC releases an Iu interface CS domain resource according to the Iu release command message received from the MSC.

314. The RNC sends an Iu release complete message to the MSC.

It should be noted that the foregoing step 301 is applied to a scenario in which local UE performs active release. If peer UE performs active release, step 301 may be omitted.

Figure 4:
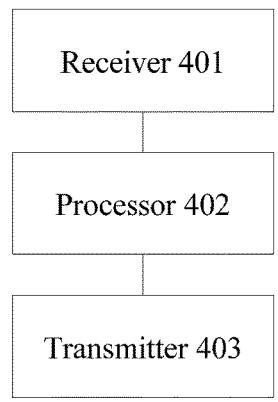
FIG. 4 is a schematic structural diagram of a fast return apparatus for CSFB user equipment according to an embodiment of the present invention.

As shown in FIG. 4, an embodiment of the present invention provides a fast return apparatus for CSFB user equipment. The apparatus may be configured to execute the method provided in the embodiment shown in FIG. 2, and may further be configured to execute operation steps of an RNC in the embodiment shown in FIG. 3. The apparatus includes a receiver 401, a processor 402, and a transmitter 403.

The receiver 401 is configured to receive a trigger message sent by an MSC, where the trigger message is used to trigger release of a CS service of CSFB user equipment, and the UE runs both the CS service and a PS service.

The processor 402 is configured to generate an RRC connection release message according to the trigger message received by the receiver 401.

The transmitter 403 is configured to send the RRC connection release message generated by the processor 402 to the UE, so as to trigger the UE to release a radio bearer of the CS service, a radio bearer of the PS service, and an RRC connection according to the RRC connection release message and fast return to a Long Term Evolution LTE network.

For the RRC connection release message, refer to related description in the embodiment shown in FIG. 2, and details are not described.

Optionally, the processor 402 is specifically configured to release, according to the trigger message received by the receiver 401, an Iu interface CS domain resource occupied by the UE.

The trigger message may be specifically an Iu release command.

Optionally, the processor 402 is further configured to: after the RRC connection release message is sent to the UE according to the trigger message, send a PS domain release request message to an SGSN according to the trigger message; and the receiver 401 is further configured to receive an Iu release command sent by the SGSN, and release an Iu interface PS domain resource occupied by the UE.

Further, the processor 402 is further configured to: trigger, according to the Iu release command sent by the SGSN, a base station to release an Iub interface CS domain resource and/or an Iub interface PS domain resource occupied by the UE.

According to the apparatus provided in the foregoing embodiment, an RRC connection release message is sent to UE after a trigger message that is for releasing a CS service and that is sent by a core network is received, so as to trigger the UE to release the CS service, a PS service, and an RRC connection according to the RRC connection release message. A release process is simplified, so that time needed to release the CS service and the PS service is reduced. Therefore, a delay for CSFB user equipment to return to an LTE network is reduced, thereby improving user experience.

Figure 5:
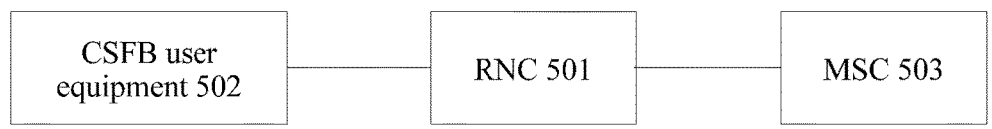
FIG. 5 is a schematic structural diagram of a fast return system for CSFB user equipment according to an embodiment of the present invention.

As shown in FIG. 5, an embodiment of the present invention provides a fast return system for CSFB user equipment, including an RNC 501, CSFB user equipment 502, and an MSC 503. The CSFB user equipment 502 runs both a CS service and a PS service.

The MSC 503 is configured to send a trigger message to the RNC 501, where the trigger message is used to trigger release of the CS service of the CSFB user equipment 502.

The RNC 501 is configured to receive the trigger message sent by the MSC 503, and send an RRC connection release message to the CSFB user equipment 502 according to the trigger message.

The CSFB user equipment 502 is configured to: receive the RRC connection release message sent by the RNC 501, release a radio bearer of the CS service, a radio bearer of the PS service, and an RRC connection according to the RRC connection release message, and fast return to an LTE network.

The trigger message may be specifically an Iu release command.

It should be noted that the RNC 501 may be configured to execute the method provided in the embodiment shown in FIG. 2, and may further be configured to execute operation steps of an RNC in the embodiment shown in FIG. 3, and details are not described herein.

Optionally, the RNC 501 is further configured to release, according to the trigger message sent by the MSC 503, an Iu interface CS domain resource occupied by the UE.

Further, the RNC 501 is further configured to trigger, according to the trigger message sent by the MSC 503, a base station to release an Iub interface CS domain resource occupied by the UE.

Figure 6:
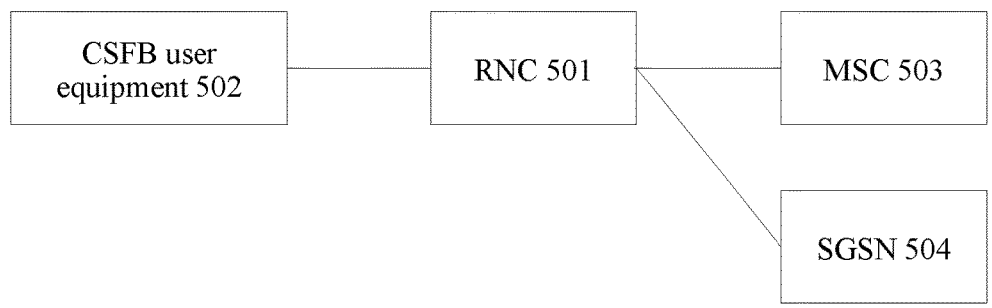
FIG. 6 is a schematic structural diagram of another fast return system for CSFB user equipment according to an embodiment of the present invention.

Optionally, referring to FIG. 6, the system further includes an SGSN 504, and specifically:

the RNC 501 is further configured to send a PS domain release request message to the SGSN 504 after receiving the trigger message sent by the MSC 503; and the SGSN 504 is configured to receive the PS domain release request message sent by the RNC 501, and release an Iu interface PS domain resource occupied by the CSFB user equipment 502.

The PS domain release request may be specifically an Iu release request (Iu release request).

Further, the RNC 501 is further configured to trigger, according to an Iu release command sent by the SGSN 504, a base station to release an Iub interface CS domain resource and/or an Iub interface PS domain resource occupied by the CSFB user equipment 502.

According to the system provided in the foregoing embodiment, an RRC connection release message is sent to UE after a trigger message that is for releasing a CS service and that is sent by a core network is received, so as to trigger the UE to release the CS service, a PS service, and an RRC connection according to the RRC connection release message. A release process is simplified, so that time needed to release the CS service and the PS service is reduced. Therefore, a delay for CSFB user equipment to return to an LTE network is reduced, thereby improving user experience.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A fast return method for a circuit switched fallback (CSFB) user equipment (UE), comprising:
   receiving a trigger message from a mobile switching center (MSC), wherein the trigger message is used to trigger release of a circuit switched (CS) service of the UE, and the UE runs both the CS service and a packet switched (PS) service;
   sending a radio resource control (RRC) connection release message to the UE according to the trigger message;
   sending a PS domain release request message to a serving general packet radio service (GPRS) support node (SGSN) according to the trigger message;
   receiving an Iu release command from the SGSN, and releasing an Iu interface PS domain resource occupied by the UE; and
   triggering, according to the Iu release command from the SGSN, a base station to release an Iub interface CS domain resource or an Iub interface PS domain resource occupied by the UE.

2. The method according to claim 1, further comprising:
   releasing, according to the trigger message, an Iu interface CS domain resource occupied by the UE.

3. The method according to claim 1, wherein the trigger message is an Iu release command.

4. A fast return apparatus for a circuit switched fallback (CSFB) user equipment (UE), comprising:
   a receiver configured to receive a trigger message from a mobile switching center (MSC), wherein the trigger message is used to trigger release of a circuit switched (CS) service of the UE, and the UE runs both the CS service and a packet switched (PS) service;
   a processor configured to generate a radio resource control (RRC) connection release message according to the trigger message received by the receiver; and
   a transmitter configured to send the RRC connection release message generated by the processor to the UE;
   the processor is further configured to send a PS domain release request message to a serving general packet radio service (GPRS) support node (SGSN) according to the trigger message;
   the receiver is further configured to receive an Iu release command from the SGSN, and release an Iu interface PS domain resource occupied by the UE; and
   the processor is further configured to trigger, according to the Iu release command that is from the SGSN and received by the receiver, a base station to release an Iub interface CS domain resource or an Iub interface PS domain resource occupied by the UE.

5. The apparatus according to claim 4, wherein the processor is further configured to:
   release, according to the trigger message, an Iu interface CS domain resource occupied by the UE.

6. The apparatus according to claim 4, wherein the trigger message is an Iu release command.

7. A fast return system for a circuit switched fallback (CSFB) user equipment (UE), comprising:
   a radio network controller (RNC);
   the UE; and
   a mobile switching center (MSC), wherein the UE runs both a circuit switched (CS) service and a packet switched (PS) service;
   the MSC is configured to send a trigger message to the RNC, wherein the trigger message is used to trigger release of the CS service of the UE;
   the RNC is configured to receive the trigger message from the MSC, and send a radio resource control (RRC) connection release message to the UE according to the trigger message; and
   the UE is configured to: receive the RRC connection release message from the RNC, release a radio bearer of the CS service, a radio bearer of the PS service, and an RRC connection according to the RRC connection release message, and fast return to an LTE network, wherein
   the system further comprises a serving general packet radio service (GPRS) support node (SGSN);
   the RNC is further configured to send a PS domain release request message to the SGSN after receiving the trigger message from the MSC;
   the SGSN is configured to receive the PS domain release request message from the RNC, and release an Iu interface PS domain resource occupied by the UE; and
   the RNC is further configured to trigger, according to an Iu release command from the SGSN, a base station to release an Iub interface CS domain resource or an Iub interface PS domain resource occupied by the UE.

8. The system according to claim 7, wherein the RNC is further configured to:
   release, according to the trigger message from the MSC, an Iu interface CS domain resource occupied by the UE.

* * * * *